Figure 4:
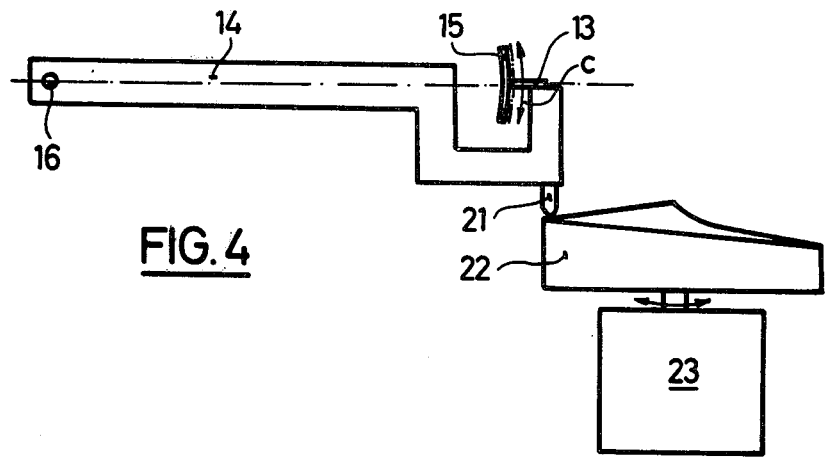

United States Patent [19]

Schoettle et al.

[11] 4,156,258
[45] May 22, 1979

[54] HEAD POSITIONING DEVICE FOR MULTI-TRACK TAPE RECORDERS

[75] Inventors: Klaus Schoettle, Heidelberg; Werner Hoffmann, Ludwigshafen; Eduard Kaemmer, Mutterstadt, all of Fed. Rep. of Germany

[73] Assignee: BASF Aktiengesellschaft, Fed. Rep. of Germany

[21] Appl. No.: 799,240

[22] Filed: May 23, 1977

[30] Foreign Application Priority Data

Jun. 14, 1976 [DE] Fed. Rep. of Germany ....... 2626525

[51] Int. Cl.$^2$ .............................................. G11B 5/02
[52] U.S. Cl. ..................................... 360/78; 360/106; 360/109
[58] Field of Search ................... 360/78, 106, 104–105, 360/109, 75

[56] References Cited

U.S. PATENT DOCUMENTS

| | | | |
|---|---|---|---|
| 2,751,274 | 6/1956 | Andrews | 360/106 X |
| 3,271,034 | 9/1966 | Andrews | 360/106 |
| 3,485,959 | 12/1969 | Roys | 360/106 X |
| 3,539,191 | 11/1970 | Yamamoto | 360/109 X |
| 3,601,409 | 8/1971 | Marshall | 360/106 |

*Primary Examiner*—John H. Wolff
*Attorney, Agent, or Firm*—Keil & Witherspoon

[57] ABSTRACT

A magnetic head positioning device for multi-track tape recorders consisting essentially of a pivotally mounted head carrier which pivots in a plane at right angles to the plane of the tape. In every position of the head carrier, the head is substantially at right angles to the surface of the tape to be scanned, and the distance between the head and the pivotal axis of the carrier is many times greater than the width of the magnetic tape. In one embodiment, the head carrier is in the form of a lever having an offset portion and is pivotally mounted opposite the capstan. In another embodiment a straight lever is provided which is pivotally mounted on the capstan side of the recorder. In a further embodiment of the invention, the end of the lever which carries the magnetic head can be pivoted in a slot in a tape guide in a plane substantially at right angles to the guide surface. The device is used preferentially for transports for very flexible tapes and extremely high track densities.

11 Claims, 6 Drawing Figures

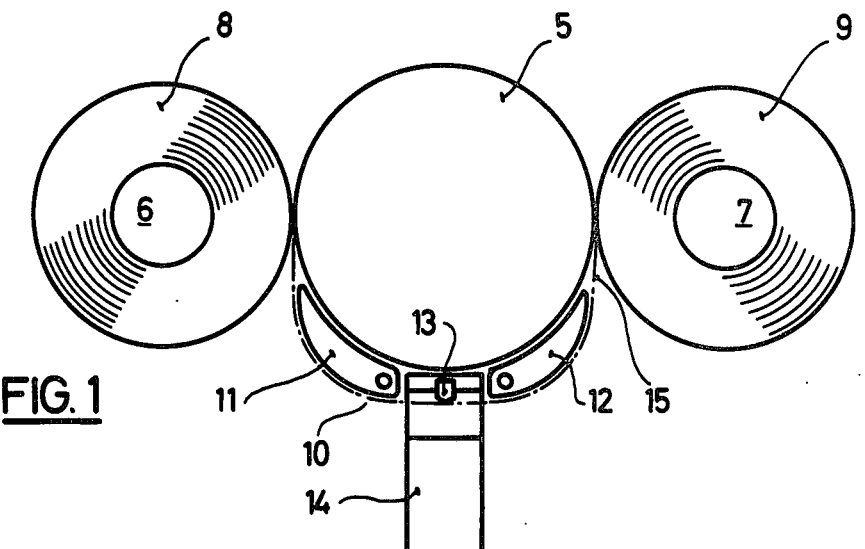
FIG.1
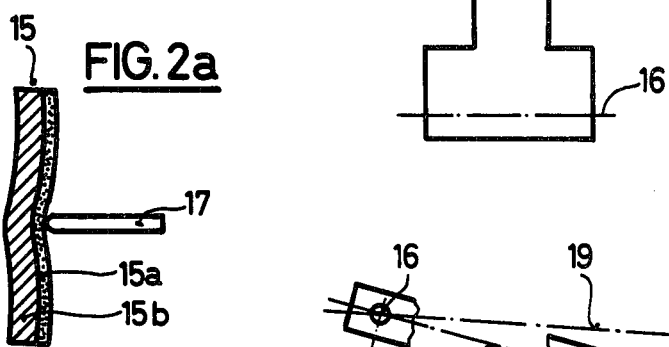
FIG.2a
FIG.2b
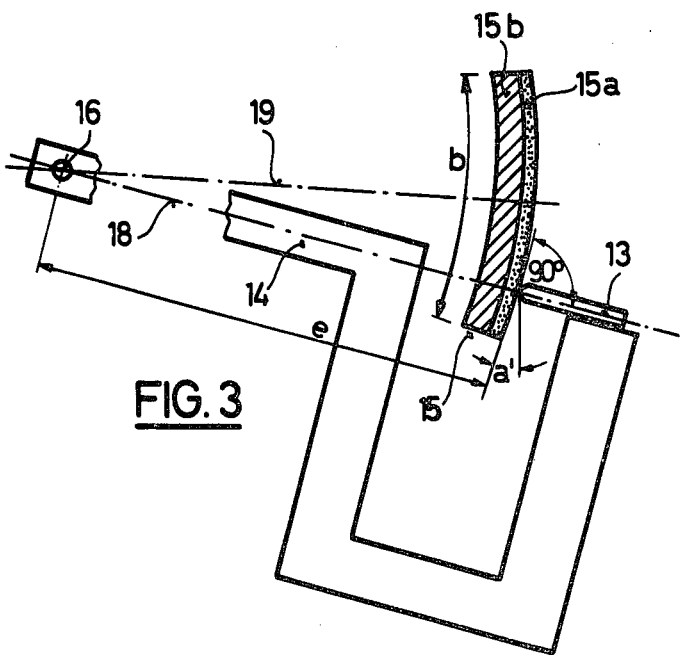
FIG.3

HEAD POSITIONING DEVICE FOR MULTI-TRACK TAPE RECORDERS

The present invention relates to a head positioning device for multi-track tape recorders for use with a flexible magnetic tape and having at least one magnetic head which is fixed to a carrier which is movable relative to the magnetic tape, the position of the carrier being adjustable by means of a control and drive device, whereby the head may be positioned relative to any one of a plurality of tracks on the tape.

Tape recorders for use with magnetic tapes on which a large number of tracks have been recorded have been disclosed. Such a recorder for tapes of normal width (6.3 mm) carrying more than twenty parallel longitudinal tracks, alternate tracks being played in opposite directions, has already been disclosed for recording and reproducing video signals, for example in German Laid-Open Application DOS No. 2,436,008. This scanning method substantially reduces the tape costs in the case of conventional video recorders, but there is an upper limit to the number of parallel tracks which can be scanned. This limit is imposed both by an electrical factor, namely the crosstalk between the tracks, and by a mechanical or an electromagnetic factor, namely the positioning of the head relative to the individual tracks.

Processes and devices for positioning the head have already been disclosed. The devices in general comprise a head support which can be moved up and down in a vertical direction by means of a stepped disc or a cam plate, which in turn is actuated or driven electro-magnetically, as a result of which movement the head is positioned relative to the desired track. The known devices can be used for a small number of tracks, but not for a very large number, since they permit neither sufficiently accurate nor sufficiently reproducible location of the head relative to the tracks.

Accordingly, it is the object of the present invention to provide a positioning device by means of which the head can be located very accurately relative to each track of a tape having a large number of longitudinal tracks.

We have found that this object is achieved with a head positioning device for multi-track tape recorders employing a flexible magnetic tape and having at least one magnetic head fixed to a carrier which is movable relative to the magnetic tape, the position of the carrier being adjustable by means of a control and drive device, whereby the head can be located relative to any one of a plurality of tracks on the tape if the carrier bearing the head is pivotally mounted relative to the tape.

This results in the surprising advantage of greatly improved tape/head contact in the edge zones of flexible magnetic tape, especially thin, very pliable tapes. Furthermore, very accurate positioning of the head relative to each track can be achieved with extremely simple means. In addition, in the recording and reproduction of video signals, a substantial increase in the signal level is attainable in spite of a large number of tracks and the attendant very narrow track width.

In a further embodiment of the invention, the plane in which the magnetic head pivots is at right angles to the plane of the tape, thereby embracing most magnetic tape applications.

In an advantageous embodiment of the head carrier and its mounting, the head is, in every position of the carrier, substantially at right angles to the surface of the magnetic tape which is to be scanned. As a result, optimum scanning is possible even in the case of very narrow track widths.

In a further embodiment of the invention, the distance between the pivotal axis of the head carrier and the head is many times greater than the width of the magnetic tape. As a result, the head can follow the dome-shaped curve, when viewed in cross section, of the tape, which curve approximates closely to the arc of a circle.

Furthermore, it is advantageous, according to the invention, to select the distance between the pivotal axis of the head carrier and the head according to the flexibility of the tape in the crosswise direction, in order to match the positioning device to the magnetic tape used.

In a further embodiment of the device according to the invention, the head carrier is in the form of a lever, especially one having an offset portion, the depth of the offset being greater than the width of the tape used.

A further advantageous measure according to the invention is to locate the pivotal axis of the head carrier both in the horizontal plane passing through the middle of the tape and in the lengthwise median plane of the head. It is thus possible to achieve symmetrical and reproducible positioning of the head with respect to any track on the tape.

A further advantageous embodiment of the invention comprises a device in which the magnetic head is attached to a carrier which is pivotally mounted and can be located in any position relative to the tape, and the magnetic tape passes over a tape guide, and in which the carrier is in the form of a lever and the distance between the magnetic head and the pivotal axis of the lever is many times the width of the magnetic tape.

In a further advantageous embodiment, the tape guide has a gap in the surface over which the tape is guided, the head contacting the tape within this gap, and the head carrier is designed, and mounted, to allow the head to pivot in a plane at right angles to the plane of the tape which is transported over the gap.

In a further practical embodiment of the device according to the invention, the control and drive device for the head carrier is a cam plate and a motor which drives the latter.

In a further simple embodiment according to the invention, the control and drive device for the head carrier consists of a spindle and a motor which drives the latter.

Some embodiments of the head positioning device of the invention are described below and shown in the accompanying drawings, in which FIG. 1 is a plan view of a tape transport apparatus with a central capstan and a head positioning device according to the invention, FIGS. 2a and 2b show the tape and head relationships as they exist in head positioning devices of the prior art, with the head located in the center of the tape and at the edge of the tape respectively, FIG. 3 shows the tape and head, with a pivotally mounted head carrier according to the invention, FIG. 4 shows a head positioning device with the head carrier according to FIG. 3.

Figure 5:
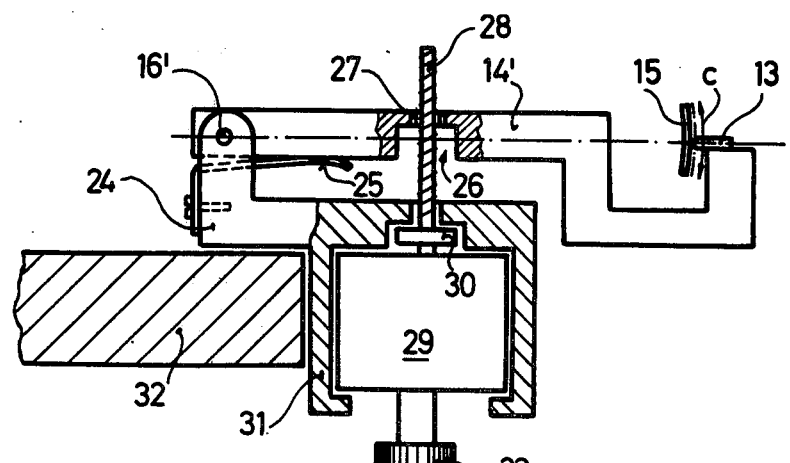

FIG. 5 shows a further head positioning device.

FIG. 1 shows a tape transport with a central capstan 5, hubs 6 and 7, tape reels 8 and 9, and a two-part tape guide 10, parts 11 and 12 being located symmetrically with respect to the capstan 5, with a gap between them. In this gap there is provided a magnetic head 13 which faces toward the magnetic coating on the magnetic tape 15 passing over guide 10. The tape 15 has a width of, eg., 6.3mm (¼ inch) and, when used for video purposes, has a large number, for instance 30 or more, eg. 40, parallel longitudinal tracks, the recording and reproduction of information, eg. video programs, being effected, for example, by playing alternate tracks in opposite directions. This method of scanning requires precise positioning of the head 13 relative to each individual magnetic track (these tracks are not shown in the drawing). The precondition for precise location of the head relative to each track is a high-precision tape guide, which in the present case is merely shown schematically as a fixed, roughly crescent-shaped guide device which will not be described in further detail.

In FIG. 1, the head 13 is attached to a T-shaped head carrier 14 which is pivotally mounted so that it can turn about the axis of pivot 16 in the bar of the T. As the head carrier 14 pivots, the vertical portion of the T moves up or down between parts 11 and 12 of the tape guide, as a result of which the head 13 moves upwards or downwards, through the arc of a circle, over the magnetic coating of the tape 15. The head carrier may also be of any other suitable shape.

FIG. 2a shows schematically, in cross-section, how head 17 touches the middle of the tape 15, consisting of the coating 15a and the base 15b, with sufficiently good contact, such as is required for video recording and reproduction. The magnetic tape 15 under a predetermined tension, which is produced by suitable means, embraces the head 17 with a sufficient angle of wrap. The tape 15 is very thin and hence very pliable and is at least partially elastically deformable, as is revealed by the indentation in the middle of the tape caused by the head, as shown in FIG. 2a. FIG. 2b shows the head 17 of a conventional positioning device on a track near the edge of the tape 15. As can be seen, the head causes the tape 15 to deflect to one side, so that the contacted part of the tape is bent over, tape/head contact being greatly impaired by the formation of a wedge-shaped gap a. In the case of a conventional recorder (FIG. 2b) with a 150 μm wide magnetic head, a tip depth of 80 μm, and using a 9 μm thick tape, 6.3 mm wide, with 28 tracks, the decrease in the signal to noise ratio of each of the outermost tracks was 6 decibels. Tape/head contact was found to be impaired in the case of the tracks in each of the edge zones of the tape 15, the edge zone being regarded as a strip starting from the actual edge and having a width of approximately one quarter of the width of the tape (about 1.6 mm in the case of a 6.3 mm tape). The wedge-shaped gap a increases in size toward the edge of the tape, so that there is a drop in the signal level toward the edges, whilst the signal level remains approximately constant over the remaining half of the tape, giving a roof-shaped curve.

If, assuming that the head is urged against the tape under the usual pressure, the head penetrates the plane of the tape, that is it dislodges the tape in the said edge zone, the tape zone contacted by the head being deflected in a direction pointing away from the head, as is also shown in FIGS. 2b and 3. The further the point of penetration is from the nearest edge of the tape, the greater is the radius of curvature of the deflected portion of the tape. In general, the curved shape of the deflected portion depends on the flexibility of the magnetic tape in the crosswise direction, both the thickness and material of the tape base, and the thickness and material of the magnetic coating having an effect on the shape of the curve and on the radius of curvature. Suitable curve shapes are arcs of a circle, as well as parts of a parabola or hyperbola. It will be understood that the above-described crosswise deflection or deformation of the tape is due to one of the edge zones of the tape being contacted under pressure in the unsupported run of the tape, that is, in the embodiment shown, the run between the inner end, FIG. 1, of tape guides 11 and 12, by the magnetic head, 17, FIG. 2b or 13, FIG. 3; but that, because of the flexibility and elasticity of the very thin tape this deformation is, for all practical purposes, only a momentary one and it does not, therefore, interfere with the proper drive of the tape—which is under tension—at the point where the take-up reel is urged, in the conventional manner against the capstan.

FIG. 3 shows the positioning device of FIG. 1, including the tape 15 with base 15b and coating 15a, the head carrier 14 and the head 13 attached thereto. The head carrier 14 is in the form of a lever having an offset portion, one end of which lever is hingedly mounted on pivot 16 (see also FIG. 1), the head 13 being mounted on the free arm of the U-shaped offset portion. The depth of the U corresponds approximately to the width of the tape, so that the upper edge tracks can also be scanned. The median plane 18 through the head 13 (FIG. 3) advantageously also passes through the axis of the pivot 16 and through the horizontal plane 19 passing through the middle of the tape, so that strictly symmetrical and comparable conditions are obtained when the head carrier 14 is moved relative to the tape 15. The head carrier 14 is shown broken, in order to show that the distance e of the head 13 from the axis of pivot 16 is in general larger than the width b of the tape. The tape is shown on an exaggerated scale in FIGS. 2a, 2b and 3. FIG. 3 clearly shows that as a result of the pivotal arrangement of the head carrier 14 the head 13 forms a substantially smaller wedge-shaped gap a' with the coating 15a than the gap a in FIG. 2b. The reason for this is that the head for this is that the head 13 is at right angles to the tape surface or, more precisely, to the tangent of the deflected curved portion of the tape. Accordingly, by pivoting the head carrier 14 the head 13 can be brought to virtually any position on the magnetic coating 15a, ie. to any track on the tape, and the head 13, in virtually any track position, is at right angles to the plane of the tape if the radius of the arc which the head 13 describes, when the head carrier is pivoted, is appropriately chosen because it is thus more or less possible to reproduce the radius of curvature of the curve produced when the tape is deflected. In this way it is possible to ensure that at least the angle of wrap of the tape around the head 13 is improved, so that even in the case of tracks at the very edge of the tape there is no appreciable reduction in tape-head contact, as a result of which a noticeable drop in the signal level when recording and reproducing video signals is avoided.

Embodiments of complete devices are shown in FIGS. 4 and 5.

FIG. 4 shows a device with conventional control and drive means, a pin 21 and a cam plate 22 which is turned by a suitable stepping motor 23. The pin 21 is attached below the offset portion of the head carrier 14 and the said carrier is urged by means of springs, which are not shown, against the cam plate 22 which can of course also be provided with steps, so as to ensure continuous contact between the pin and cam plate. All the parts already described bear the same reference numbers as in the other Figures. The double arrow c indicates the directions of movement of the head.

FIG. 5 shows a device which essentially corresponds to that of FIG. 4, but which employs different control and drive means. The head carrier 14' is pivotally mounted on a frame 24 and is biassed by a leaf spring 25. The head carrier is provided with a recess 26 and a threaded portion 27 through which there passes a thin spindle 28 serving as control means. The spindle 28 is caused to rotate by a suitable motor 29 so that the head 13 on the head carrier 14' moves upwards or downwards in a vertical direction, as shown by double arrow c, and can accordingly be positioned relative to any track on the tape. A collar 30, which runs up against the frame 24, is provided on the spindle 28 to limit vertical movement of the head. The motor 29 is attached to the frame 24 by flanges 31, so that the positioning device forms a compact unit which can be suitable fixed to the top 32 of the recorder.

Apart from the details described, all requisite control devices, machine components, such as fixing means, and the like, have been omitted in the interest of simplicity of representation and because they are known to those skilled in the art.

Other embodiments of the positioning device of the invention which also come within the scope of protection of the appended claims are conceivable.

We claim:

1. A head positioning device for multi-track tape recorders for use with a flexible magnetic tape and having a magnetic head which is fixed to a carrier which is movable relative to the magnetic tape, the position of the carrier being adjustable by means of a control and drive unit, whereby the head may be positioned relative to any one of a plurality of tracks on the tape, wherein said head is of a width substantially smaller than that of the tape;

wherein the carrier bearing the magnetic head is mounted for movement relative to the tape about a pivotal axis; and wherein said pivotal axis is located in the horizontal plane passing normally through the middle of the tape longitudinal axis on the side of the tape opposite to that on which the head contacts the magnetic layer of the tape so that, when said carrier is pivoted to an angular position departing from said horizontal plane, the corresponding edge zone of said tape is deflected by said head in a direction towards said pivotal axis, with the head in every angular position of said carrier being substantially at right angles to the surface of the magnetic tape being scanned wherein the distance between the magnetic head and the pivoted axis of the head carrier is selected so that the radius of curvature of the curve produced by the deflection of the tape by the head is substantially reproduced.

2. A device as claimed in claim 1, wherein the plane in which the carrier bearing the magnetic head pivots is at right angles to the plane of the tape.

3. A device as claimed in claim 1, wherein the distance between the magnetic head and the pivotal axis of the head carrier is many times greater than the width of the magnetic tape.

4. A device as claimed in claim 1, wherein the distance between the magnetic head and the pivotal axis of the head carrier is selected, according to the flexibility of the tape in the crosswise direction.

5. A device as claimed in claim 1, wherein the head carrier is in the form of a lever having an offset portion, the depth of the offset being greater than the width of the tape used.

6. A device as claimed in claim 6 wherein the tape is guided by means of a tape guide having a gap in the surface over which the tape is guided, the tape being contacted by said head, but being otherwise unsupported, within said gap.

7. A device as claimed in claim 6, wherein the pivotal axis of the lever is located both in the horizontal plane passing through the middle of the tape and in the lengthwise median plane of the head when said head is pivoted away from said horizontal plane.

8. A device as claimed in claim 6, wherein said lever is designed, and mounted, to pivot in a plane at right angles to the plane of the tape which is transported over the gap.

9. A device as claimed in claim 1, wherein the pivotal axis of the head carrier is located both in the horizontal plane passing through the middle of the tape and in the lengthwise median plane of the head when said head is pivoted away from said horizontal plane.

10. A device as claimed in claim 1, wherein the control and drive device for the head carrier consists of a cam plate and a motor which drives the latter.

11. A device as claimed in claim 1, wherein the control and drive unit for the head carrier includes a spindle and a motor which drives the spindle.

* * * * *

UNITED STATES PATENT AND TRADEMARK OFFICE
CERTIFICATE OF CORRECTION

PATENT NO. : 4,156,258
DATED : May 22, 1979
INVENTOR(S) : KLAUS SCHOETTLE ET AL.

It is certified that error appears in the above-identified patent and that said Letters Patent are hereby corrected as shown below:

Claim 6, line 1, change "in claim 6 wherein" to --in claim 5 wherein--

Signed and Sealed this

Twentieth Day of November 1979

[SEAL]

Attest:

RUTH C. MASON
Attesting Officer

LUTRELLE F. PARKER
Acting Commissioner of Patents and Trademarks